(12) United States Patent
Kibayashi et al.

(10) Patent No.: US 11,560,147 B2
(45) Date of Patent: Jan. 24, 2023

(54) INFORMATION PROVIDING DEVICE, MOVABLE BODY, AND METHOD OF PROVIDING INFORMATION

(71) Applicant: HONDA MOTOR CO., LTD., Tokyo (JP)

(72) Inventors: Takeshi Kibayashi, Wako (JP); Yoshinori Kinoshita, Wako (JP); Takayuki Kishi, Wako (JP); Hironori Aoyagi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 128 days.

(21) Appl. No.: 17/199,826

(22) Filed: Mar. 12, 2021

(65) Prior Publication Data
US 2021/0284160 A1    Sep. 16, 2021

(30) Foreign Application Priority Data
Mar. 16, 2020 (JP) .............................. JP2020-044970

(51) Int. Cl.
*B60W 30/18* (2012.01)
*B60W 40/04* (2006.01)
(Continued)

(52) U.S. Cl.
CPC .... *B60W 30/181* (2013.01); *B60W 30/18154* (2013.01); *B60W 30/18159* (2020.02);
(Continued)

(58) Field of Classification Search
CPC ......... B60W 30/181; B60W 30/18159; B60W 30/18154; B60W 40/04; B60W 40/08;
(Continued)

(56) References Cited

U.S. PATENT DOCUMENTS

| 2016/0123747 A1 | 5/2016 | Takeuchi |
| 2016/0148511 A1* | 5/2016 | Shibata .................. G08G 1/166 701/119 |

FOREIGN PATENT DOCUMENTS

| CN | 105393085 A | 3/2016 |
| JP | 2009-104543 A | 5/2009 |

(Continued)

OTHER PUBLICATIONS

Office Action including search report dated Sep. 28, 2022 issued over the corresponding Chinese Patent Application No. 202110280818.3 with the English translation of the pertinent portion of Office Action.

*Primary Examiner* — Nicholas Kiswanto
*Assistant Examiner* — Jamal A Shah
(74) *Attorney, Agent, or Firm* — Carrier Shende & Associates, P.C.; Joseph P. Carrier; Fulchand P. Shende

(57) ABSTRACT

An information providing device includes an external environment recognition unit that recognizes an external environmental situation of a movable body, an information providing control unit that provides a notification of recommended stopping information based on a current indication of traffic signals recognized by the external environment recognition unit, and a determination unit which determines, in the case that a first intersection and a second intersection are positioned in a travel direction of the movable body, whether or not a degree of proximity of the first intersection and the second intersection satisfies a predetermined condition. In the case it is determined by the determination unit that the predetermined condition is satisfied, the information providing control unit prevents the recommended stopping information based on a current indication of the traffic signal belonging to the second intersection from being provided.

14 Claims, 10 Drawing Sheets

(51) Int. Cl.
  *B60W 50/14*   (2020.01)
  *B60W 40/08*   (2012.01)
  *G06V 20/58*   (2022.01)

(52) U.S. Cl.
  CPC ............ *B60W 40/04* (2013.01); *B60W 40/08* (2013.01); *B60W 50/14* (2013.01); *G06V 20/584* (2022.01); *B60W 2050/146* (2013.01); *B60W 2540/225* (2020.02); *B60W 2555/60* (2020.02)

(58) Field of Classification Search
  CPC ........... B60W 50/14; B60W 2540/225; B60W 2555/60; B60W 2050/146; G06V 20/584
  See application file for complete search history.

(56) References Cited

FOREIGN PATENT DOCUMENTS

| | | |
|---|---|---|
| JP | 2014-096016 A | 5/2014 |
| JP | 2015-099560 A | 5/2015 |

\* cited by examiner

INFORMATION PROVIDING DEVICE, MOVABLE BODY, AND METHOD OF PROVIDING INFORMATION

CROSS-REFERENCE TO RELATED APPLICATION

This application is based upon and claims the benefit of priority from Japanese Patent Application No. 2020-044970 filed on Mar. 16, 2020, the contents of which are incorporated herein by reference.

BACKGROUND OF THE INVENTION

Field of the Invention

The present invention relates to an information providing device, a movable body, and a method of providing information.

Description of the Related Art

In Japanese Laid-Open Patent Publication No. 2009-104543, an information providing device is disclosed that outputs driving assist information including dangerous traveling regions based on vehicle speed information and traffic signal information.

SUMMARY OF THE INVENTION

However, in Japanese Laid-Open Patent Publication No. 2009-104543, it is not always possible to accurately provide a notification concerning recommended stopping information.

An object of the present invention is to provide an information providing device, a movable body, and a method of providing information, which are capable of accurately providing a notification of recommended stopping information.

An information providing device according to one aspect of the present invention includes an external environment recognition unit configured to recognize an external environmental situation of a movable body, an information providing control unit configured to provide a notification of recommended stopping information based on a current indication of traffic signals recognized by the external environment recognition unit, and a determination unit configured to determine, in the case that a first intersection and a second intersection are positioned in a travel direction of the movable body, whether or not a degree of proximity of the first intersection and the second intersection satisfies a predetermined condition, wherein, in the case it is determined by the determination unit that the predetermined condition is satisfied, the information providing control unit prevents the recommended stopping information based on a current indication of the traffic signal belonging to the second intersection from being provided.

A movable body according to another aspect of the present invention includes the above-described information providing device.

A method of providing information according to another aspect of the present invention includes a determination step of determining, in the case that a first intersection and a second intersection are positioned in a travel direction of a movable body, whether or not a degree of proximity of the first intersection and the second intersection satisfies a predetermined condition, and a prevention step of preventing notification of the recommended stopping information based on a current indication of the traffic signal belonging to the second intersection from being provided, in the case it is determined, in the determination step, that the predetermined condition is satisfied.

According to the present invention, it is possible to provide an information providing device, a movable body, and a method of providing information, which are capable of accurately providing a notification of recommended stopping information.

The above and other objects, features, and advantages of the present invention will become more apparent from the following description when taken in conjunction with the accompanying drawings, in which preferred embodiments of the present invention are shown by way of illustrative example.

DETAILED DESCRIPTION OF THE PREFERRED EMBODIMENTS

Preferred embodiments of an information providing device, a movable body, and a method of providing information according to the present invention will be presented and described in detail below with reference to the accompanying drawings.

First Embodiment

Figure 1:
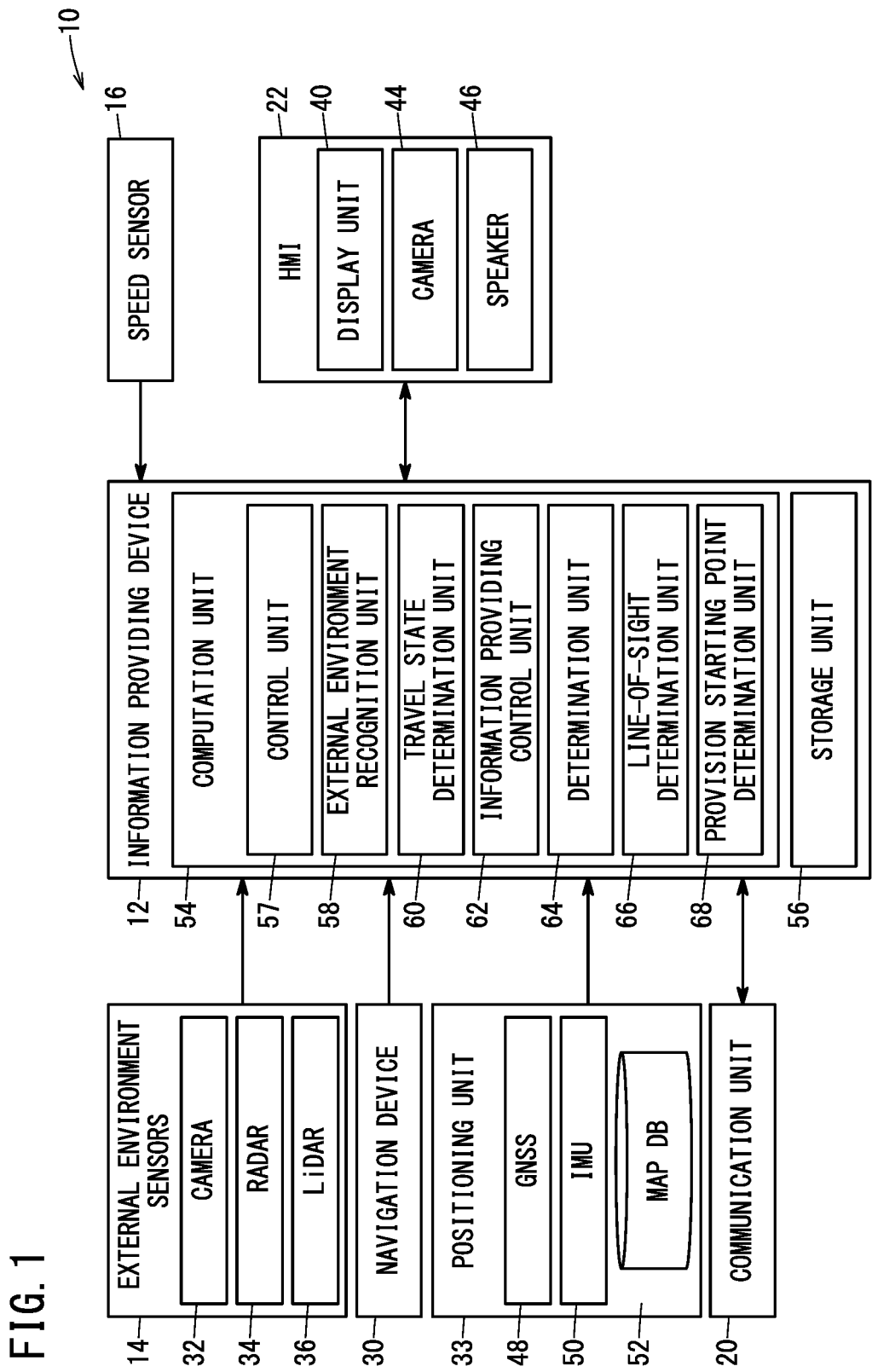
FIG. 1 is a block diagram showing a movable body equipped with an information providing device according to a first embodiment.

An information providing device, a movable body, and a method of providing information according to a first embodiment will be described with reference to the drawings. FIG. 1 is a block diagram showing a movable body equipped with an information providing device according to a present embodiment. In this instance, although an exemplary case will be described in which the movable body 10 is a vehicle, the movable body 10 is not limited to being a vehicle. For example, the movable body 10 may be a robot or the like.

The movable body 10 is equipped with an information providing device 12, namely, a notification control ECU (Electronic Control Unit). The movable body 10 is further equipped with external environment sensors 14, a speed sensor 16, a communication unit 20, an HMI (Human Machine Interface) 22, a navigation device 30, and a positioning unit 33. Although the movable body 10 is equipped with other constituent elements apart from those noted above, description of such elements is omitted herein.

The external environment sensors 14 acquire external environmental information, and more specifically, information concerning the external environment around the movable body 10. The external environment sensors 14 include a plurality of cameras 32 and a plurality of radar devices 34. Among the external environment sensors 14, there are further included a plurality of LiDAR (Light Detection and Ranging, Laser Imaging Detection and Ranging) devices 36.

Information acquired by cameras (imaging units) 32, i.e., camera information, is supplied from the cameras 32 to the information providing device 12. As such camera information, there may be cited captured image information and the like. The camera information, together with radar information and LiDAR information to be described later, makes up the external environmental information. Although a single camera 32 is illustrated in FIG. 1, a plurality of cameras 32 are actually provided.

The radar devices 34 emit transmitted waves toward the exterior of the movable body 10, and receive reflected waves that are reflected and returned by detected objects. As examples of the transmitted waves, there may be cited electromagnetic waves. As examples of the electromagnetic waves, there may be cited millimeter waves. The radar devices 34 generate radar information (reflected wave signals) based on the reflected waves or the like. The radar devices 34 supply the generated radar information to the information providing device 12. Although one radar device 34 is illustrated in FIG. 1, a plurality of radar devices 34 are actually provided in the movable body 10. Moreover, the radar devices 34 are not limited to using millimeter wave radar. For example, laser radar devices, or ultrasonic sensors or the like may be used as the radar devices 34.

The LiDAR devices 36 continuously irradiate lasers in all directions of the movable body 10, measure the three-dimensional position of reflection points based on reflected waves of the emitted lasers, and output information, i.e., three-dimensional information, in relation to the three-dimensional positions. The LiDAR devices 36 supply the three-dimensional information, i.e., LiDAR information, to the information providing device 12. Although one LiDAR device 36 is illustrated in FIG. 1, a plurality of LiDAR devices 36 are actually provided in the movable body 10.

The speed sensor 16 can detect the speed, and in particular a vehicle speed, of the movable body 10. The information detected by the speed sensor 16, and specifically, information indicating the speed of the movable body 10, can be supplied to an information providing control unit 62.

The communication unit 20 performs wireless communications with non-illustrated external equipment. The external equipment may include, for example, a non-illustrated external server.

The HMI 22 receives an operation input made by the vehicle occupant, and provides various types of information to the vehicle occupant in a visual, audible, or tactile manner. The HMI 22 may include, for example, a display unit 40, a camera 44, and a speaker 46.

The display unit 40 is capable of displaying predetermined information. As the display unit 40, there can be used, for example, a liquid crystal display, an organic EL display, or the like, however, the display unit 40 is not limited to such displays. Further, the display unit 40 may be equipped, for example, with a touch panel, although the display unit 40 is not limited to this feature. Recommended stopping information or the like, which will be described later, can be displayed on the display unit 40.

The camera 44 captures images of the interior, i.e., a non-illustrated vehicle compartment interior, of the movable body 10. The camera 44 may supply information for determining a line of sight of the vehicle occupant to a line-of-sight determination unit 66, which will be described later.

The speaker 46 serves to provide various types of information to the vehicle occupant by way of sound or voice. The speaker 46 may provide the later-described recommended stopping information or the like to the vehicle occupant by way of voice.

The navigation device 30 is equipped with a non-illustrated GNSS (Global Navigation Satellite System) sensor. In addition, the navigation device 30 is further equipped with a non-illustrated computation unit and a non-illustrated storage unit. The GNSS sensor detects the current position of the movable body 10. From a map database stored in the storage unit, the computation unit reads out map information corresponding to the current position detected by the GNSS sensor. Using the map information, the computation unit determines a target route from the current position to a destination. The destination is input by the vehicle occupant via the HMI 22. As noted above, the display unit 40 may be equipped with a touch panel. Input of the destination may be carried out by the touch panel being operated by the vehicle occupant. The navigation device 30 is capable of outputting a created target route to the information providing device 12. The information providing device 12 can supply the target route to the HMI 22. The HMI 22 may display the target route on the display unit 40.

The positioning unit 33 is equipped with a GNSS 48. The positioning unit 33 is further equipped with an IMU (Inertial Measurement Unit) 50 and a map database (map DB) 52. The positioning unit 33 specifies the position of the movable body 10 by appropriately using the information obtained by the GNSS 48, the information obtained by the IMU 50, and the map information stored in the map database 52. The positioning unit 33 is capable of supplying self-identifying position information, or stated otherwise, position information of the movable body 10, which is information indicative of the position of the movable body 10, with respect to the information providing device 12. Further, the positioning unit 33 is capable of supplying the map information with respect to the information providing device 12.

The information providing device 12 is equipped with a computation unit 54 and a storage unit 56. The computation unit 54 governs the overall control of the information providing device 12. The computation unit 54, for example, can be constituted by at least one processor. As such a processor, there may be used, for example, a CPU (Central Processing Unit) or the like. The computation unit 54 executes an information providing control by controlling each of the respective units based on programs stored in the storage unit 56.

In the computation unit 54, there are provided a control unit 57, an external environment recognition unit 58, a travel state determination unit 60, an information providing control unit 62, a determination unit 64, a line-of-sight determination unit 66, and a provision starting point determination unit 68. The control unit 57, the external environment recognition unit 58, the travel state determination unit 60, the information providing control unit 62, the determination unit 64, the line-of-sight determination unit 66, and the provision starting point determination unit 68 can be realized by programs, which are stored in the storage unit 56, being executed by the computation unit 54.

The storage unit 56 includes a non-illustrated volatile memory, and a non-illustrated nonvolatile memory. As an example of the volatile memory, there may be cited a RAM (Random Access Memory). As an example of the nonvolatile memory, there may be cited a ROM (Read Only Memory), a flash memory, or the like. The external environmental information, vehicle body behavior information, and movable body operation information and the like, are stored, for example, in the volatile memory. Programs, tables, maps, and the like are stored, for example, in the nonvolatile memory.

The control unit 57 governs the overall control of the information providing device 12.

Figure 2:
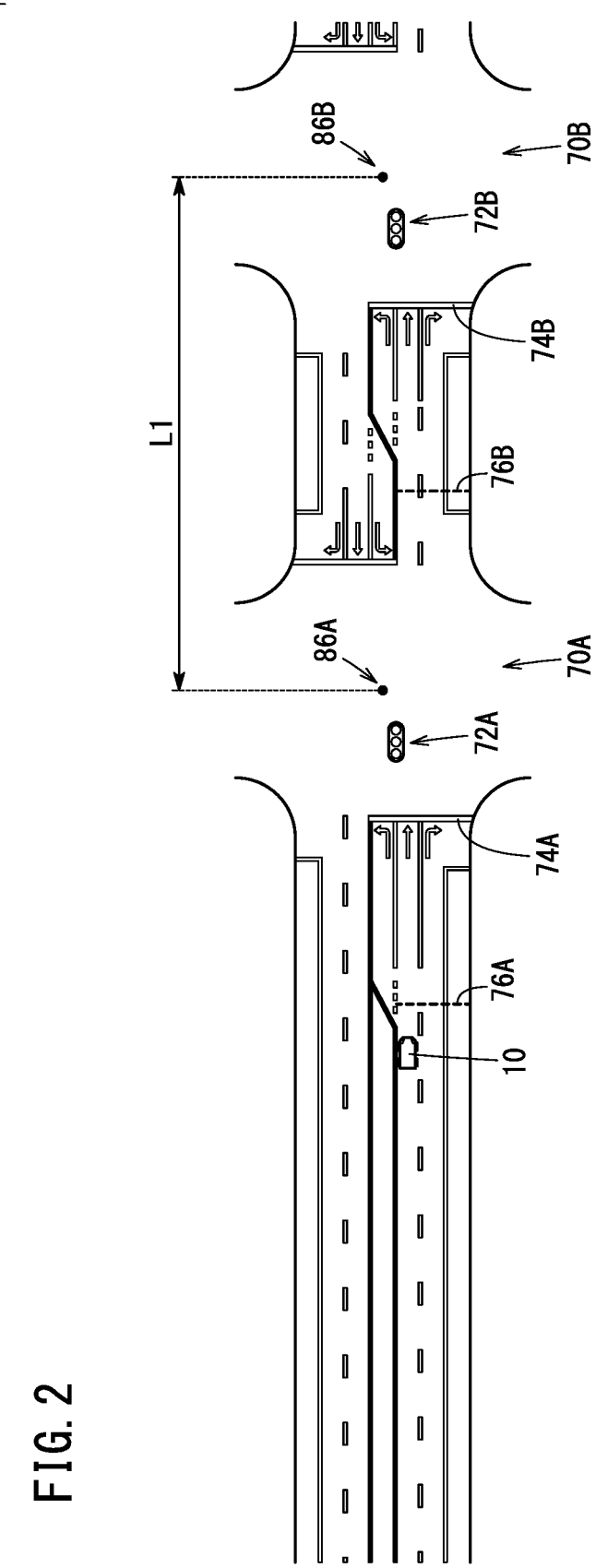
FIG. 2 is a view showing an example of a travel lane.

FIG. 2 is a view showing an example of a travel lane. An exemplary case in which a first intersection 70A and a second intersection 70B are positioned in a travel direction of the movable body 10 is shown in FIG. 2. The reference numeral 70 will be used when describing the intersections in general, whereas the reference numerals 70A and 70B will be used when describing the individual intersections. A first traffic signal 72A belonging to the first intersection 70A and a second traffic signal 72B belonging to the second intersection 70B are further shown in FIG. 2. The reference numeral 72 will be used when describing the traffic signals in general, whereas the reference numerals 72A and 72B will be used when describing the individual traffic signals. A stop line 74A corresponding to the first traffic signal 72A and a stop line 74B corresponding to the second traffic signal 72B are further shown in FIG. 2. The reference numeral 74 will be used when describing the stop lines in general, whereas the reference numerals 74A and 74B will be used when describing the individual stop lines. A provision starting point 76A corresponding to the first traffic signal 72A and a provision starting point 76B corresponding to the second traffic signal 72B are further shown in FIG. 2. The reference numeral 76 will be used when describing the provision starting points in general, whereas the reference numerals 76A and 76B will be used when describing the individual provision starting points. The provision starting points 76 are points at which the recommended stopping information, which will be described later, should start to be provided. The provision starting point 76A is a provision starting point for a case in which the first traffic signal 72A is currently displaying an indication to stop, and the provision starting point 76B is a provision starting point for a case in which the second traffic signal 72B is currently displaying an indication to stop.

The external environment recognition unit 58 is capable of recognizing the external environmental situation of the movable body 10. The external environment recognition unit 58 can recognize the external environmental situation of the movable body 10, based on external environmental information supplied from the external environment sensors 14 or the like, and more specifically, based on the external environmental information supplied from the camera 32. Based on the external environmental information, the external environment recognition unit 58 is capable of recognizing the positions of intersections 70A and 70B, the positions of traffic signals 72A and 72B, the current indications of the traffic signals 72A and 72B, and the positions of stop lines 74A and 74B respectively for the traffic signals 72A and 72B. Moreover, the external environment recognition unit 58 may recognize the aforementioned features, on the basis of information supplied from the navigation device 30, the communication unit 20, and the like.

The travel state determination unit 60 is capable of determining the travel state of the movable body 10. More specifically, based on the information supplied from the speed sensor 16 and the like, the travel state determination unit 60 is capable of determining the travel state of the movable body 10.

The information providing control unit 62 is capable of providing recommended stopping information based on the current indications of the traffic signals 72 recognized by the external environment recognition unit 58. The information providing control unit 62 can perform control in a manner so that the recommended stopping information is displayed on the display unit 40. For example, display of the recommended stopping information can be carried out by displaying traffic signals that are illuminated in red on the display unit 40, but the present invention is not limited to this feature. Further, the information providing control unit 62 may provide the recommended stopping information using the speaker 46. For example, provision of the recommended stopping information can be carried out by outputting a prompt to perform braking by way of voice from the speaker 46, but the present invention is not limited to this feature.

In the case that a degree of proximity between the first intersection 70A and the second intersection 70B satisfies the predetermined condition described below, the information providing control unit 62 is capable of preventing the recommended stopping information based on the current indication of the second traffic signal 72B belonging to the second intersection 70B from being provided.

The determination unit 64 determines that the predetermined condition is satisfied, for example, in the case that a distance L1 between the first intersection 70A and the second intersection 70B is less than a distance threshold value TH1. The distance L1, for example, is a distance between a center 86A of the first intersection 70A and a center 86B of the second intersection 70B, however, the present invention is not limited to this feature. The reference numeral 86 will be used when describing the centers of the intersections 70 in general, whereas the reference numerals 86A and 86B will be used when describing the individual centers of the intersections 70. In the case it is determined by the determination unit 64 that such a predetermined condition is satisfied, the information providing control unit 62 is capable of preventing the recommended stopping information based on the current indication of the second traffic signal 72B belonging to the second intersection 70B from being provided. In such a case, the reason that the recommended stopping information based on the current indication of the second traffic signal 72B belonging to the second intersection 70B is prevented from being provided is as follows. Namely, in the case that the first intersection 70A and the second intersection 70B are in close proximity to each other, the following situation can occur. More specifically, a situation may arise in which it is difficult for the vehicle occupant to distinguish whether the recommended stopping information is being generated based on the current indication of the first traffic signal 72A belonging to the first intersection 70A or based on the current indication of the second traffic signal 72B belonging to the second intersection 70B. Accordingly, from the standpoint of preventing the vehicle occupant from being confused, it is preferable to prevent the recommended stopping information based on the current indication of the second traffic signal 72B belonging to the second intersection 70B from being provided. For this reason, when the aforementioned predetermined condition is satisfied, it is possible to prevent the recommended stopping information based on the current indication of the second traffic signal 72B belonging to the second intersection 70B from being provided.

The line-of-sight determination unit 66 is capable of determining the line of sight of the vehicle occupant based on information supplied from the camera 44 or the like. In the case it is determined by the line-of-sight determination unit 66 that the line of sight of the vehicle occupant is not directed toward the display unit 40, the information providing control unit 62 does not prevent the recommended stopping information based on the current indication of the second traffic signal 72B belonging to the second intersection 70B from being provided by the display unit 40. More specifically, in such a case, the information providing control unit 62 causes the display unit 40 to display the recommended stopping information based on the current indication of the second traffic signal 72B belonging to the second intersection 70B. The reason why the recommended stopping information based on the current indication of the second traffic signal 72B belonging to the second intersection 70B is not prevented from being provided by the display unit 40 in the case that the line of sight of the vehicle occupant is not directed toward the display unit 40, is as follows. More specifically, in such a case, even if the recommended stopping information based on the current indication of the second traffic signal 72B belonging to the second intersection 70B is displayed on the display unit 40, the vehicle occupant will not observe the recommended stopping information. Accordingly, in such a case, even if the recommended stopping information based on the current indication of the second traffic signal 72B belonging to the second intersection 70B is displayed on the display unit 40, the vehicle occupant will not become confused. Due to this reason, in the case it is determined by the line-of-sight determination unit 66 that the line of sight of the vehicle occupant is not directed toward the display unit 40, the recommended stopping information based on the current indication of the second traffic signal 72B belonging to the second intersection 70B is not prevented from being provided by the display unit 40.

The provision starting point determination unit 68 is capable of determining the provision starting points 76A and 76B, which are points at which the recommended stopping information should start to be provided. The reference numeral 76 will be used when describing the provision starting points in general, whereas the reference numerals 76A and 76B will be used when describing the individual provision starting points. The provision starting point determination unit 68 is capable of determining the provision starting points 76 based on the positions of the stop lines 74 corresponding to the traffic signals 72. More specifically, the provision starting point determination unit 68 is capable of determining the provision starting points 76 based on the positions of the stop lines 74 corresponding to the traffic signals 72, and the speed of the movable body 10. Further, the provision starting point determination unit 68 may determine the provision starting points 76, on the basis of information supplied from the navigation device 30, the communication unit 20, and the like.

Figure 3:
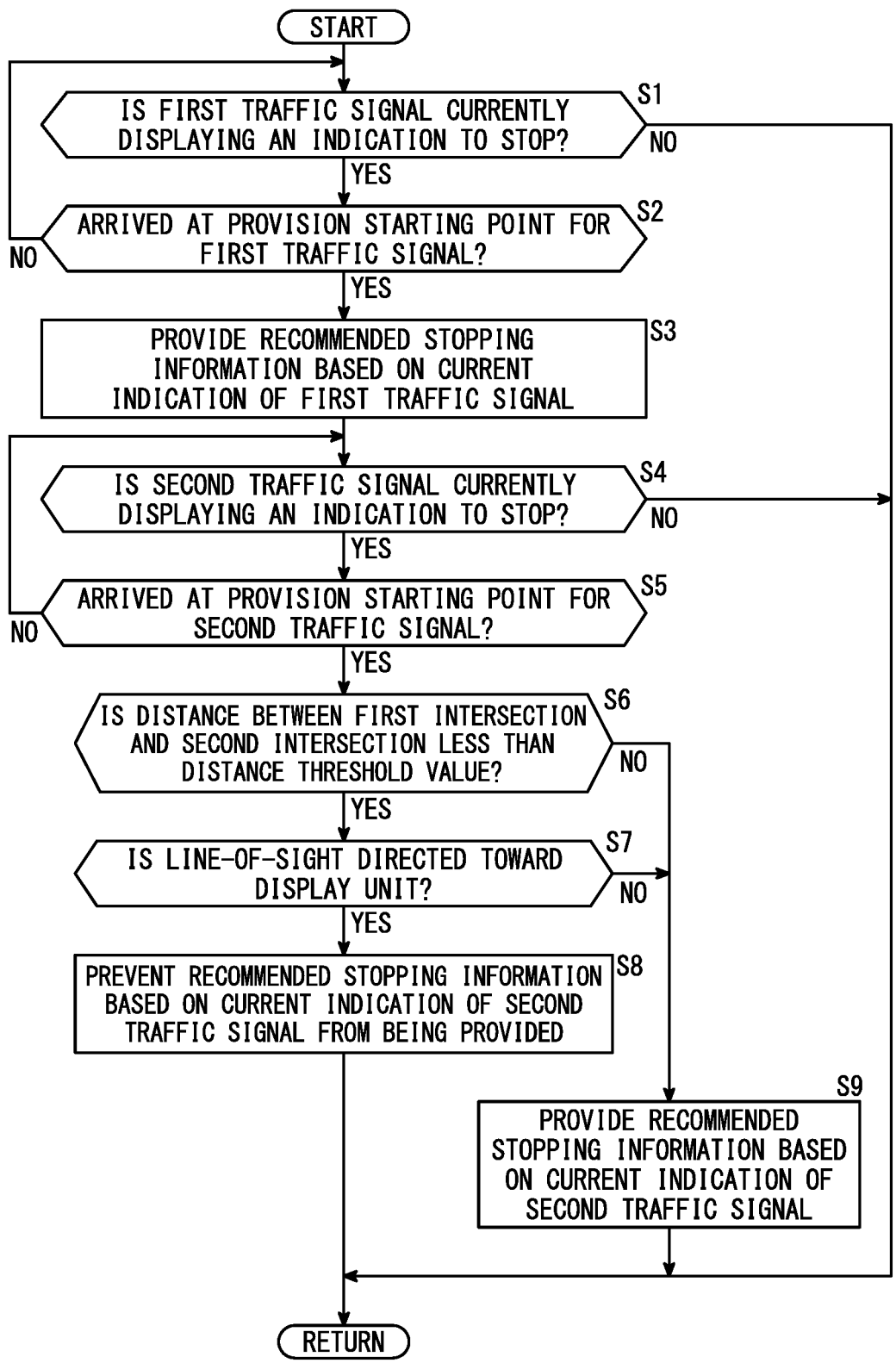
FIG. 3 is a flowchart showing an example of operations of the information providing device according to the first embodiment.

FIG. 3 is a flowchart showing an example of operations of the information providing device according to the present embodiment.

In step S1, the external environment recognition unit 58 determines whether or not the first traffic signal 72A belonging to the first intersection 70A is currently displaying an indication to stop. If the first traffic signal 72A is currently displaying an indication to stop (YES in step S1), the process transitions to step S2. If the first traffic signal 72A is not currently displaying an indication to stop (NO in step S1), the process shown in FIG. 3 is brought to an end.

In step S2, the information providing control unit 62 determines whether or not the movable body 10 has arrived at the provision starting point 76A corresponding to the first traffic signal 72A. In the case that the movable body 10 has not arrived at the provision starting point 76A corresponding to the first traffic signal 72A (NO in step S2), the processes of step S1 and thereafter are repeated. In the case that the movable body 10 has arrived at the provision starting point 76A corresponding to the first traffic signal 72A (YES in step S2), the process transitions to step S3.

In step S3, the information providing control unit 62 provides the recommended stopping information based on the current indication of the first traffic signal 72A. Thereafter, the process transitions to step S4.

In step S4, the external environment recognition unit 58 determines whether or not the second traffic signal 72B is currently displaying an indication to stop. If the second traffic signal 72B is currently displaying an indication to stop (YES in step S4), the process transitions to step S5. If the second traffic signal 72B is not currently displaying an indication to stop (NO in step S4), the process shown in FIG. 3 is brought to an end.

In step S5, the information providing control unit 62 determines whether or not the movable body 10 has arrived at the provision starting point 76B corresponding to the second traffic signal 72B. In the case that the movable body 10 has not arrived at the provision starting point 76B corresponding to the second traffic signal 72B (NO in step S5), the processes of step S4 and thereafter are repeated. In the case that the movable body 10 has arrived at the provision starting point 76B corresponding to the second traffic signal 72B (YES in step S5), the process transitions to step S6.

In step S6, the determination unit 64 determines whether or not the distance L1 between the first intersection 70A and the second intersection 70B is less than the distance threshold value TH1. In the case that the distance L1 between the first intersection 70A and the second intersection 70B is less than the distance threshold value TH1 (YES in step S6), the process transitions to step S7. In the case that the distance L1 between the first intersection 70A and the second intersection 70B is greater than or equal to the distance threshold value TH1 (NO in step S6), the process transitions to step S9.

In step S7, the line-of-sight determination unit 66 determines whether or not the line of sight of the vehicle occupant is directed toward the display unit 40. In the case that the line-of-sight determination unit 66 determines that the line of sight of the vehicle occupant is directed toward the display unit 40 (YES in step S7), the process transitions to step S8. In the case that the line-of-sight determination unit 66 determines that the line of sight of the vehicle occupant is not directed toward the display unit 40 (NO in step S7), the process transitions to step S9.

In step S8, the information providing control unit 62 prevents the recommended stopping information based on the current indication of the second traffic signal 72B from being provided. More specifically, the information providing control unit 62 does not cause the provision of the recommended stopping information based on the current indication of the second traffic signal 72B to be displayed on the display unit 40.

In step S9, the information providing control unit 62 provides the recommended stopping information based on the current indication of the second traffic signal 72B. More specifically, the information providing control unit 62 causes the provision of the recommended stopping information to be displayed on the display unit 40 based on the current indication of the second traffic signal 72B. Upon doing so, the process shown in FIG. 3 is brought to an end.

In the foregoing manner, according to the present embodiment, in the case that the degree of proximity between the first intersection 70A and the second intersection 70B satisfies the predetermined condition, the recommended stopping information based on the current indication of the second traffic signal 72B belonging to the second intersection 70B is prevented from being provided. More specifically, in the case it is determined by the determination unit 64 that the distance L1 between the first intersection 70A and the second intersection 70B is less than the distance threshold value TH1, the recommended stopping information based on the current indication of the second traffic signal 72B belonging to the second intersection 70B is prevented from being provided. Therefore, according to the present embodiment, even in the case that the first intersection 70A and the second intersection 70B are relatively in close proximity to each other, it is possible to prevent the recommended stopping information, which may cause confusion to the vehicle occupant, from being provided. In this manner, according to the present embodiment, the information providing device 12 can be provided which is capable of accurately providing the recommended stopping information.

Modification

Figure 4:
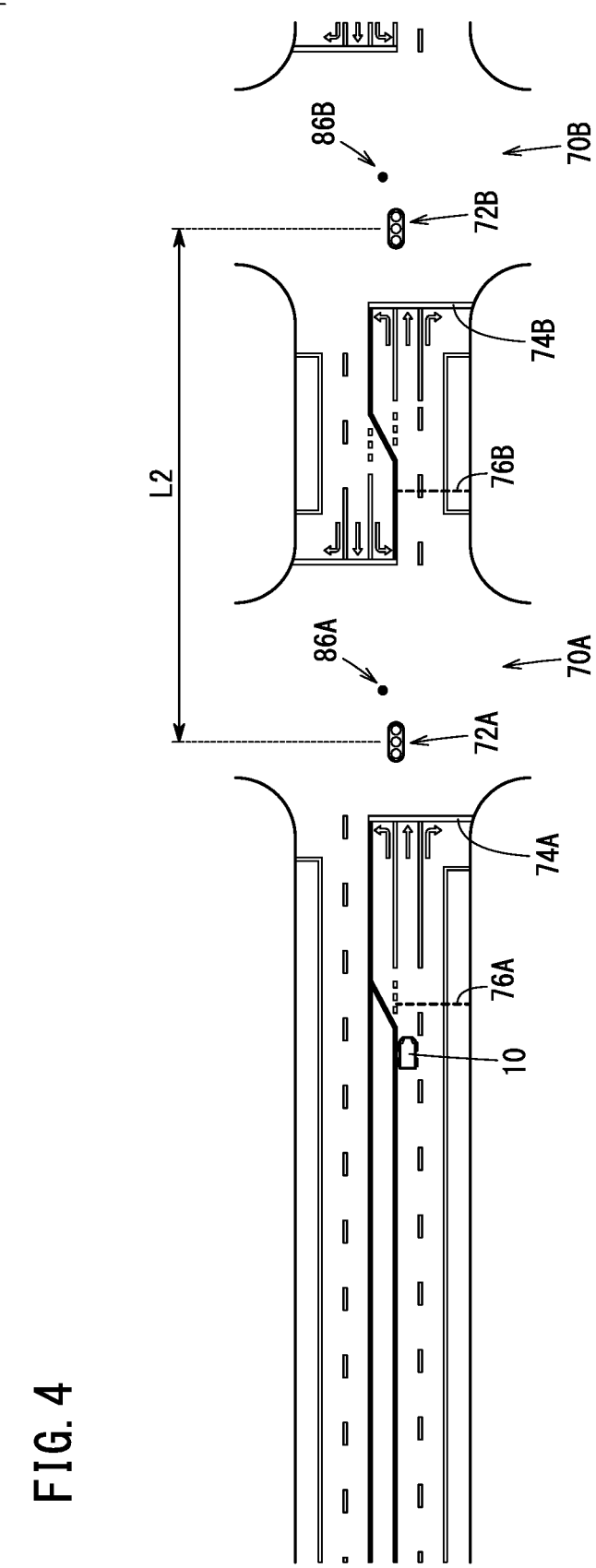
FIG. 4 is a view showing an example of a travel lane.

An information providing device, a movable body, and an information providing method according to a modification of the present embodiment will be described with reference to the drawings. FIG. 4 is a view showing an example of a travel lane.

According to the present modification, in the case that the distance L2 between the first traffic signal 72A belonging to the first intersection 70A and the second traffic signal 72B belonging to the second intersection 70B is less than the distance threshold value TH2, the determination unit 64 determines that the predetermined condition is satisfied. In the case it is determined by the determination unit 64 that such a predetermined condition is satisfied, according to the present modification, the recommended stopping information based on the current indication of the second traffic signal 72B is prevented from being provided.

Figure 5:
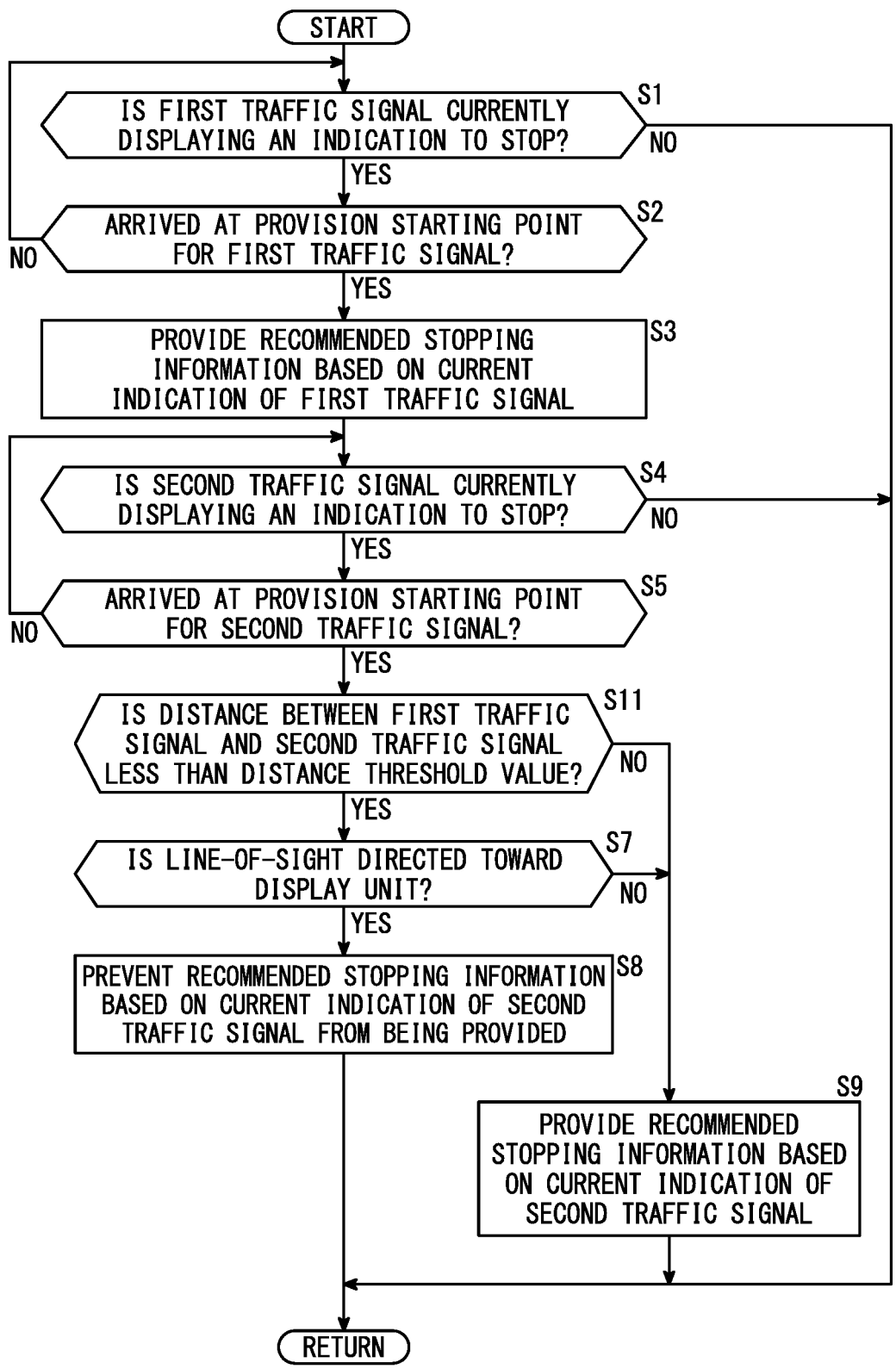
FIG. 5 is a flowchart showing an example of operations of the information providing device according to a modification of the first embodiment.

FIG. 5 is a flowchart illustrating an example of operations of the information providing device according to the present modification.

Steps S1 to S5 are the same as steps S1 to S5 described above with reference to FIG. 3, and therefore, description of these steps is omitted. In the case that the movable body 10 has not arrived at the provision starting point 76B corresponding to the second traffic signal 72B (NO in step S5), the processes of step S4 and thereafter are repeated. In the case that the movable body 10 has arrived at the provision starting point 76B corresponding to the second traffic signal 72B (YES in step S5), the process transitions to step S11.

In step S11, the determination unit 64 determines whether or not the distance L2 between the first traffic signal 72A belonging to the first intersection 70A and the second traffic signal 72B belonging to the second intersection 70B is less than the distance threshold value TH2. In the case that the distance L2 between the first traffic signal 72A and the second traffic signal 72B is less than the distance threshold value TH2 (YES in step S11), the process transitions to step S7. In the case that the distance L2 between the first traffic signal 72A and the second traffic signal 72B is greater than or equal to the distance threshold value TH2 (NO in step S11), the process transitions to step S9.

Steps S7 to S9 are the same as steps S7 to S9 described above with reference to FIG. 3, and therefore, description of these steps is omitted. Upon carrying out these steps, the process shown in FIG. 5 is brought to an end.

In the foregoing manner, in the case it is determined by the determination unit 64 that the distance L2 between the first traffic signal 72A and the second traffic signal 72B is less than the distance threshold value TH2, the recommended stopping information based on the current indication of the second traffic signal 72B may be prevented from being provided. According to the present modification as well, in the case that the first intersection 70A and the second intersection 70B are relatively in close proximity to each other, the recommended stopping information based on the current indication of the second traffic signal 72B is prevented from being provided. Therefore, according to the present modification as well, it is possible to prevent the recommended stopping information, which may cause confusion to the vehicle occupant, from being provided. In this manner, according to the present modification as well, the information providing device can be provided which is capable of accurately providing the recommended stopping information.

Second Embodiment

Figure 6:
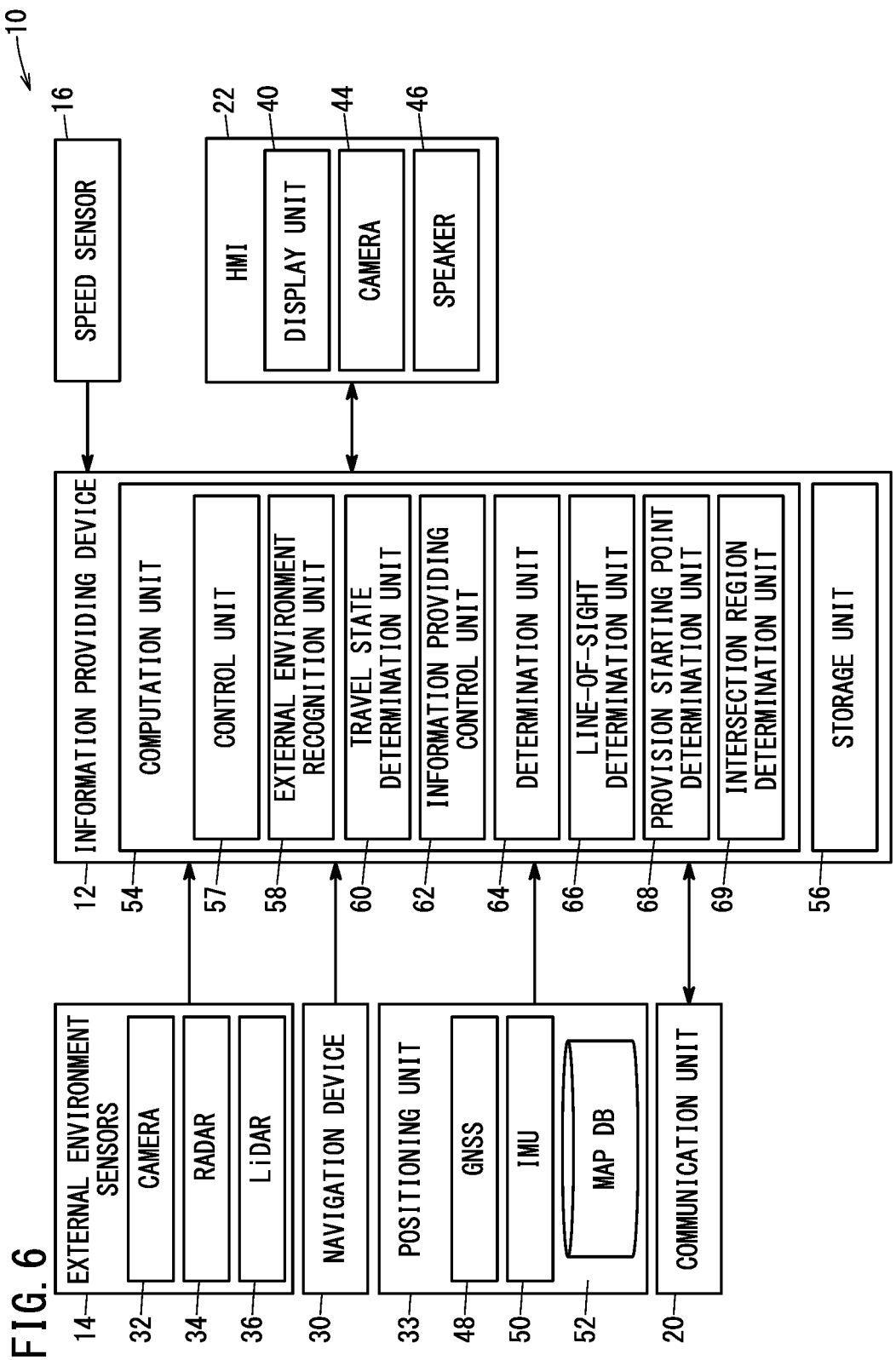
FIG. 6 is a block diagram showing a movable body equipped with an information providing device according to a second embodiment.

An information providing device, a movable body, and a method of providing information according to a second embodiment will be described with reference to the drawings. FIG. 6 is a block diagram showing a movable body equipped with an information providing device according to the present embodiment.

Figure 7:
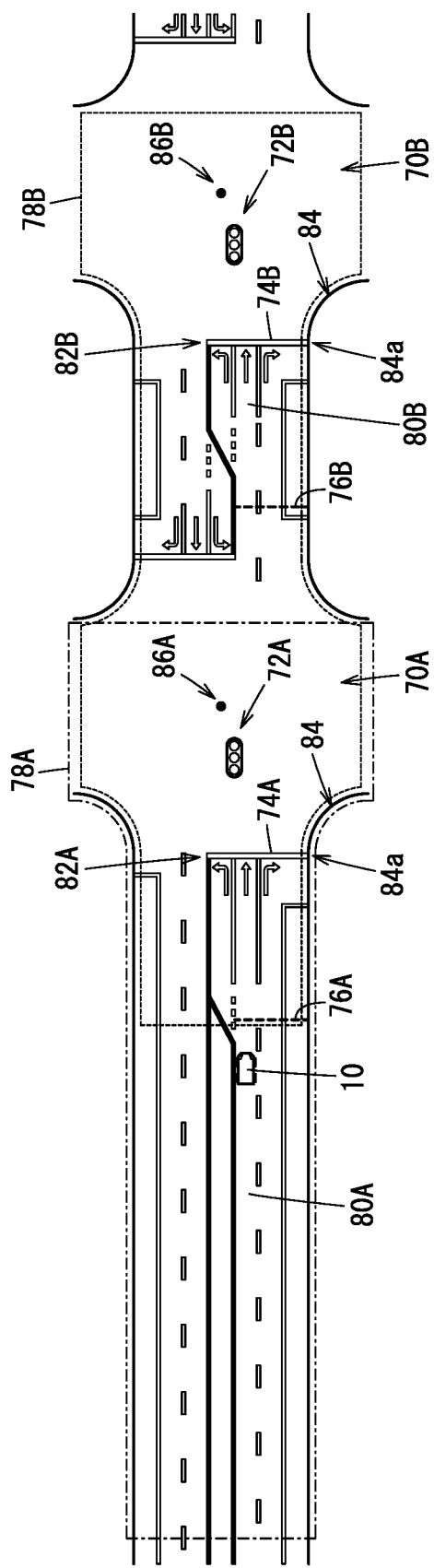
FIG. 7 is a view showing an example of a travel lane.

The information providing device 12 according to the present embodiment is further equipped with an intersection region determination unit (intersection region setting unit) 69. FIG. 7 is a view showing an example of a travel lane. The intersection region determination unit 69 is capable of setting a first intersection region 78A with respect to the first intersection 70A. More specifically, the intersection region determination unit 69 is capable of setting, as the first intersection region 78A, a region that includes the region of the first intersection 70A and a region of a predetermined length positioned on a front side of the first intersection 70A. The intersection region determination unit 69 is capable of setting a second intersection region 78B with respect to the second intersection 70B. More specifically, the intersection region determination unit 69 is capable of setting, as the second intersection region 78B, a region that includes the region of the second intersection 70B and a region of a predetermined length positioned on a front side of the second intersection 70B. In this manner, the intersection region determination unit 69 is capable of setting intersection regions 78 with respect to the respective intersections 70. The reference numeral 78 will be used when describing the intersection regions in general, whereas the reference numerals 78A and 78B will be used when describing the individual intersection regions. Moreover, in this instance, although an exemplary case has been described in which the intersection region determination unit 69 sets the intersection regions 78, the present invention is not necessarily limited to this feature. The intersection region 78 may also be determined by the intersection region determination unit 69, on the basis of information supplied from the navigation device 30, the communication unit 20, and the like.

The intersection region determination unit 69, for example, is capable of determining the first intersection region 78A on the basis of an intersection boundary 82A, which is a boundary between the first intersection 70A and the lane 80A. The intersection region determination unit 69 is capable of determining the second intersection region 78B on the basis of an intersection boundary 82B, which is a boundary between the second intersection 70B and the lane 80B. The reference numeral 80 will be used when describing the lanes in general, whereas the reference numerals 80A and 80B will be used when describing the individual lanes. The reference numeral 82 will be used when describing the intersection boundaries in general, whereas the reference numerals 82A and 82B will be used when describing the individual intersection boundaries. The intersection boundaries 82 may coincide, for example, with the stop lines 74. Alternatively, the intersection boundaries 82 may coincide with starting points 84a of curved lines forming contours of corner portions 84 of the intersections 70. The starting points 84a of the curved lines forming the contours of the corner portions 84 are locations forming boundaries between straight lines along the lanes 80 and the curved lines of the contours of the corner portions 84. The intersection region determination unit 69 may determine the intersection regions 78 on the basis of the centers 86 of the intersections 70.

The determination unit 64 is capable of determining that the predetermined condition is satisfied, in the case that the first intersection region 78A determined by the intersection region determination unit 69 with respect to the first intersection 70A, and the second intersection region 78B determined by the intersection region determination unit 69 with respect to the second intersection 70B overlap. In the case it is determined by the determination unit 64 that such a predetermined condition is satisfied, the information providing control unit 62 is capable of preventing the recommended stopping information based on the current indication of the second traffic signal 72B belonging to the second intersection 70B from being provided.

Figure 8:
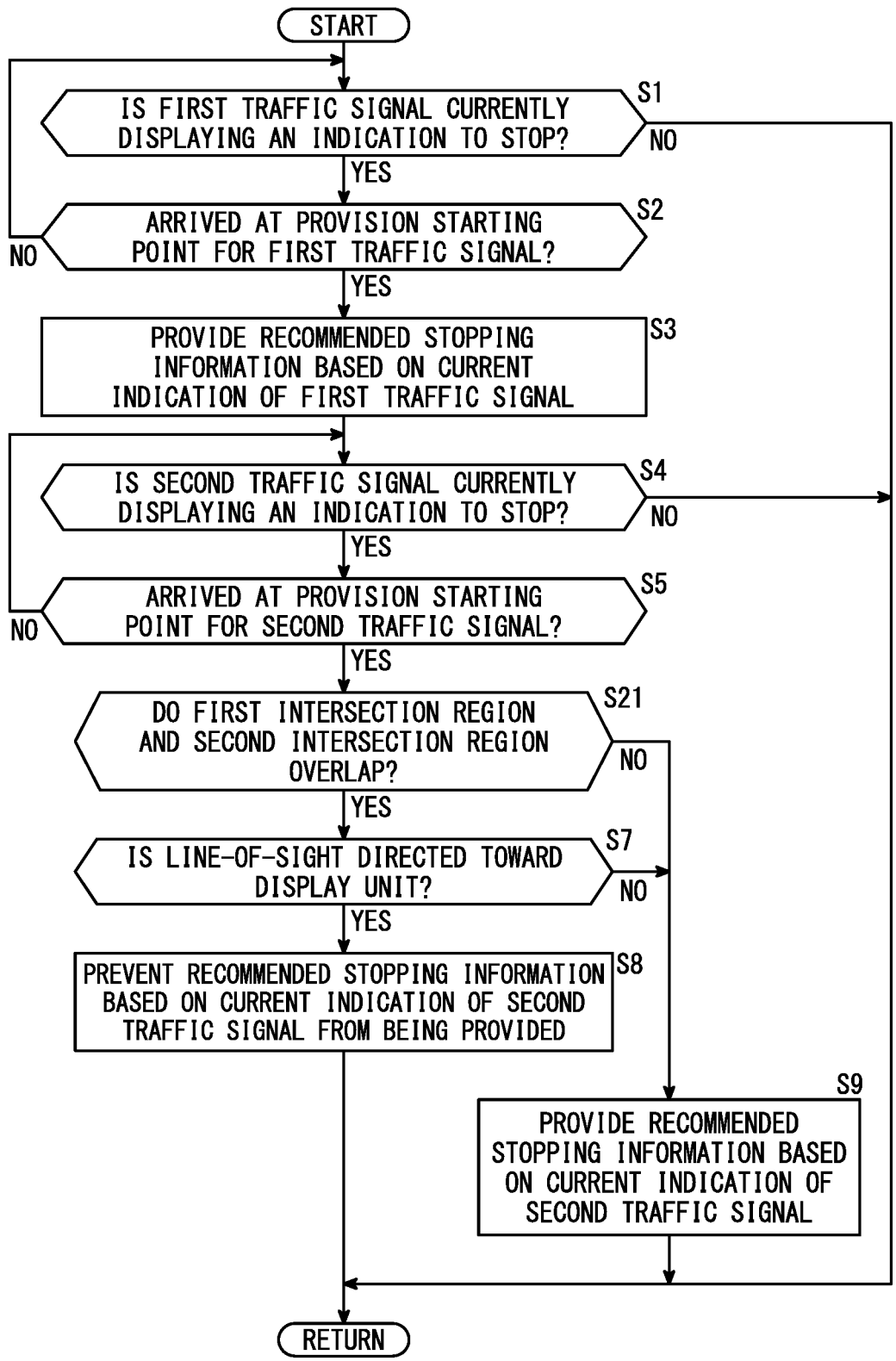
FIG. 8 is a flowchart showing an example of operations of the information providing device according to the second embodiment.

FIG. 8 is a flowchart showing an example of operations of the information providing device according to the present embodiment.

Steps S1 to S5 are the same as steps S1 to S5 described above with reference to FIG. 3, and therefore, description of these steps is omitted. In the case that the movable body 10 has not arrived at the provision starting point 76B corresponding to the second traffic signal 72B (NO in step S5), the processes of step S4 and thereafter are repeated. In the case that the movable body 10 has arrived at the provision starting point 76B corresponding to the second traffic signal 72B (YES in step S5), the process transitions to step S21.

In step S21, the determination unit 64 determines whether or not the first intersection region 78A and the second intersection region 78B overlap. If the first intersection region 78A and the second intersection region 78B overlap (YES in step S21), the process transitions to step S7. If the first intersection region 78A and the second intersection region 78B do not overlap (NO in step S21), the process transitions to step S9.

Steps S7 to S9 are the same as steps S7 to S9 described above with reference to FIG. 3, and therefore, description of these steps is omitted. Upon carrying out these steps, the process shown in FIG. 8 is brought to an end.

In the foregoing manner, in the case it is determined by the determination unit 64 that the first intersection region 78A and the second intersection region 78B overlap, the recommended stopping information based on the current indication of the second traffic signal 72B is prevented from being provided. According to the present embodiment as well, in the case that the first intersection 70A and the second intersection 70B are relatively in close proximity to each other, the recommended stopping information based on the current indication of the second traffic signal 72B is prevented from being provided. Therefore, according to the present embodiment as well, it is possible to prevent the recommended stopping information, which may cause confusion to the vehicle occupant, from being provided. In this manner, in the present embodiment, the information providing device 12 can be provided which is capable of accurately providing the recommended stopping information.

First Modification

An information providing device, a movable body, and an information providing method according to a first modification of the present embodiment will be described with reference to the drawings.

The information providing control unit 62 starts providing the recommended stopping information based on the current indication of the first traffic signal 72A belonging to the first intersection 70A at the provision starting point 76A, and thereafter, continues to provide the recommended stopping information until the movable body 10 is positioned outside of the first intersection region 78A. According to the present modification, in the case that the movable body 10 is positioned inside the second intersection region 78B within a period during which the recommended stopping information based on the current indication of the first traffic signal 72A belonging to the first intersection 70A continues to be provided, the determination unit 64 determines that the predetermined condition is satisfied. In the case it is determined by the determination unit 64 that such a predetermined condition is satisfied, the information providing control unit 62 is capable of preventing the recommended stopping information based on the current indication of the second traffic signal 72B belonging to the second intersection 70B from being provided.

Figure 9:
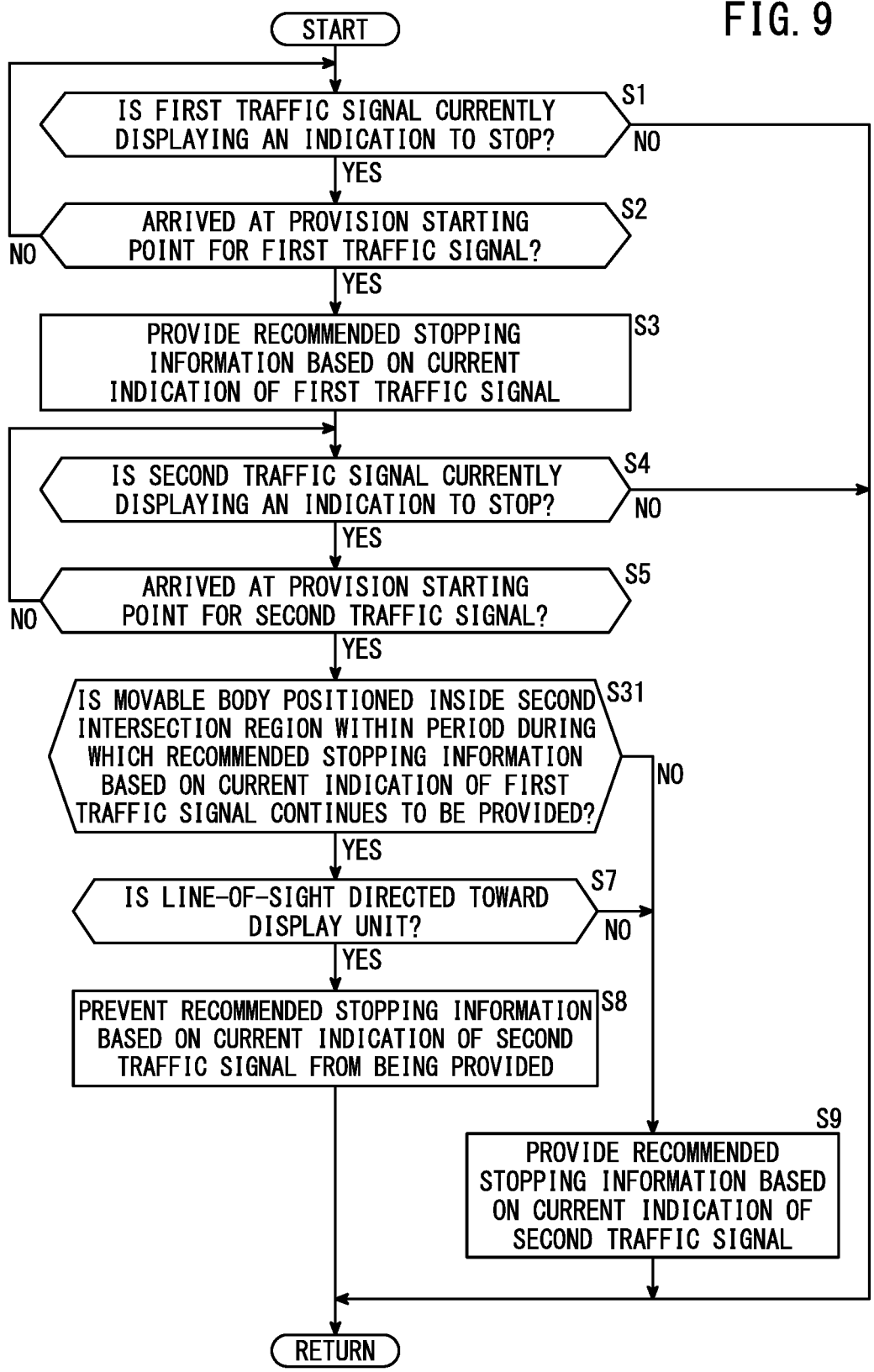
FIG. 9 is a flowchart showing an example of operations of the information providing device according to a first modification (Modification 1) of the second embodiment.

FIG. 9 is a flowchart illustrating an example of operations of the information providing device according to the present modification.

Steps S1 to S5 are the same as steps S1 to S5 described above with reference to FIG. 3, and therefore, description of these steps is omitted. In the case that the movable body 10 has not arrived at the provision starting point 76B corresponding to the second traffic signal 72B (NO in step S5), the processes of step S4 and thereafter are repeated. In the case that the movable body 10 has arrived at the provision starting point 76B corresponding to the second traffic signal 72B (YES in step S5), the process transitions to step S31.

In step S31, the determination unit 64 determines whether or not the movable body 10 is positioned inside the second intersection region 78B within a period during which the recommended stopping information based on the current indication of the first traffic signal 72A belonging to the first intersection 70A continues to be provided. In the case that the movable body 10 is positioned inside the second intersection region 78B within the period during which the recommended stopping information based on the current indication of the first traffic signal 72A belonging to the first intersection 70A continues to be provided (YES in step S31), the process transitions to step S7. In the case that the movable body 10 is not positioned inside the second intersection region 78B within the period during which the recommended stopping information based on the current indication of the provision starting point 76A of the first traffic signal 72A belonging to the first intersection 70A continues to be provided (NO in step S31), the process transitions to step S9.

Steps S7 to S9 are the same as steps S7 to S9 described above with reference to FIG. 3, and therefore, description of these steps is omitted. Upon carrying out these steps, the process shown in FIG. 9 is brought to an end.

In the foregoing manner, in the case that the provision starting point 76A corresponding to the first traffic signal 72A belonging to the first intersection 70A is positioned inside the second intersection region 78B, the recommended stopping information based on the current indication of the second traffic signal 72B is prevented from being provided. According to the present modification as well, in the case that the first intersection 70A and the second intersection 70B are relatively in close proximity to each other, the recommended stopping information based on the current indication of the second traffic signal 72B is prevented from being provided. Therefore, according to the present modification as well, it is possible to prevent the recommended stopping information, which may cause confusion to the vehicle occupant, from being provided. In this manner, according to the present modification as well, the information providing device 12 can be provided which is capable of accurately providing the recommended stopping information.

Second Modification

An information providing device, a movable body, and an information providing method according to a second modification of the present embodiment will be described with reference to the drawings.

In the present modification, in the case that the stop line 74A corresponding to the first traffic signal 72A belonging to the first intersection 70A is positioned inside the second intersection region 78B, the determination unit 64 determines that the predetermined condition is satisfied. In the case it is determined by the determination unit 64 that such a predetermined condition is satisfied, the information providing control unit 62 is capable of preventing the recommended stopping information based on the current indication of the second traffic signal 72B belonging to the second intersection 70B from being provided.

Figure 10:
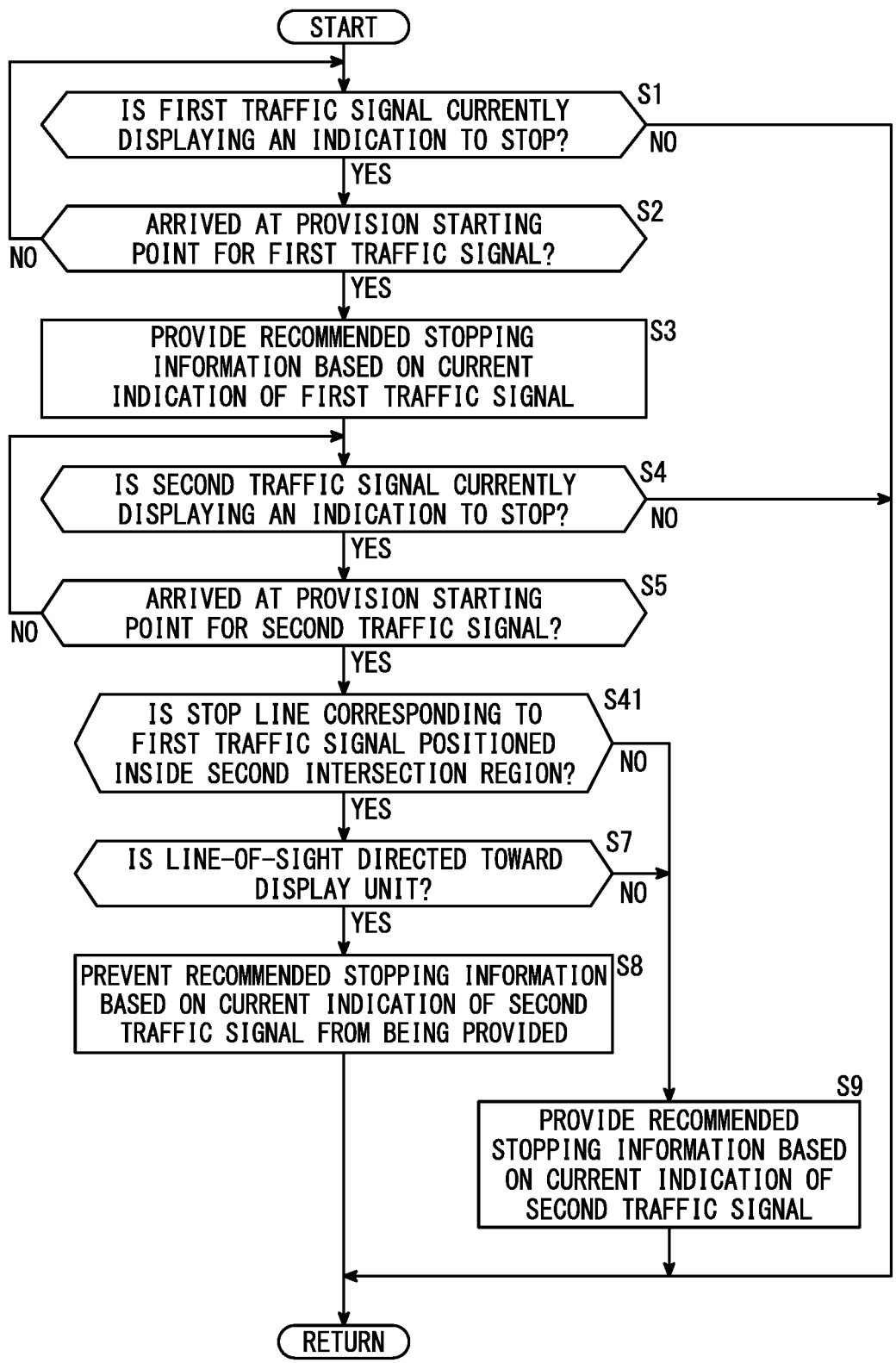
FIG. 10 is a flowchart showing an example of operations of the information providing device according to a second modification (Modification 2) of the second embodiment.

FIG. 10 is a flowchart illustrating an example of operations of the information providing device according to the present modification.

Steps S1 to S5 are the same as steps S1 to S5 described above with reference to FIG. 3, and therefore, description of these steps is omitted. In the case that the movable body 10 has not arrived at the provision starting point 76B corresponding to the second traffic signal 72B (NO in step S5), the processes of step S4 and thereafter are repeated. In the case that the movable body 10 has arrived at the provision starting point 76B corresponding to the second traffic signal 72B (YES in step S5), the process transitions to step S41.

In step S41, the determination unit 64 determines whether or not the stop line 74A corresponding to the first traffic signal 72A belonging to the first intersection 70A is positioned inside the second intersection region 78B. In the case that the stop line 74A corresponding to the first traffic signal 72A belonging to the first intersection 70A is positioned inside the second intersection region 78B (YES in step S41), the process transitions to step S7. In the case that the stop line 74A corresponding to the first traffic signal 72A belonging to the first intersection 70A is not positioned inside the second intersection region 78B (NO in step S41), the process transitions to step S9.

Steps S7 to S9 are the same as steps S7 to S9 described above with reference to FIG. 3, and therefore, description of these steps is omitted. Upon carrying out these steps, the process shown in FIG. 10 is brought to an end.

In the foregoing manner, in the case that the movable body 10 is positioned inside the second intersection region 78B within the period during which the recommended stopping information based on the current indication of the first traffic signal 72A belonging to the first intersection 70A continues to be provided, the recommended stopping information based on the current indication of the second traffic signal 72B is prevented from being provided. According to the present modification as well, in the case that the first intersection 70A and the second intersection 70B are relatively in close proximity to each other, the recommended stopping information based on the current indication of the second traffic signal 72B is prevented from being provided. Therefore, according to the present modification as well, it is possible to prevent the recommended stopping information, which may cause confusion to the vehicle occupant, from being provided. In this manner, according to the present modification as well, the information providing device 12 can be provided which is capable of accurately providing the recommended stopping information.

Although preferred embodiments of the present invention have been described above, the present invention is not limited to the above-described embodiments, and various modifications can be made thereto without departing from the essence and gist of the present invention.

Summarizing the above-described embodiments and the modifications thereof, the characteristic features described below are realized.

The information providing device (12) includes the external environment recognition unit (58) that recognizes the external environmental situation of the movable body (10), the information providing control unit (62) that provides a notification of the recommended stopping information based on the current indication of the traffic signals (72A and 72B) recognized by the external environment recognition unit, and the determination unit (64) which determines, in the case that the first intersection (70A) and the second intersection (70B) are positioned in the travel direction of the movable body, whether or not a degree of proximity of the first intersection and the second intersection satisfies the predetermined condition. In the case it is determined by the determination unit that the predetermined condition is satisfied, the information providing control unit prevents the recommended stopping information based on the current indication of the traffic signal (72B) belonging to the second intersection from being provided. In accordance with such a configuration, in the case that the first intersection and the second intersection are relatively in close proximity to each other, the recommended stopping information based on the current indication of the second traffic signal can be prevented from being provided, and thus it is possible to prevent the recommended stopping information, which may cause confusion to the vehicle occupant, from being provided. More specifically, in accordance with such a configuration, the information providing device can be provided which is capable of accurately providing the recommended stopping information.

The determination unit may determine that the predetermined condition is satisfied, in the case that the distance (L1) between the first intersection and the second intersection is less than the distance threshold value (TH1).

The determination unit may determine that the predetermined condition is satisfied, in the case that the distance (L2) between the traffic signal belonging to the first intersection and the traffic signal belonging to the second intersection is less than the distance threshold value (TH2).

There may further be provided the intersection region determination unit (69) that determines the first intersection region (78A) corresponding to the first intersection, and the second intersection region (78B) corresponding to the second intersection, and the determination unit may determine that the predetermined condition is satisfied, in the case that the first intersection region and the second intersection region overlap.

There may further be provided the intersection region determination unit that determines the first intersection region corresponding to the first intersection and the second intersection region corresponding to the second intersection, and the provision starting point determination unit (68) that determines the provision starting point (76A, 76B), which is a point at which the provision of the recommended stopping information based on the current indication of the traffic signal belonging to the first intersection should be started, wherein the information providing control unit, after having started to provide the recommended stopping information at the provision starting point, may continue to provide the recommended stopping information until the movable body is positioned outside of the first intersection region, and the determination unit may determine that the predetermined condition is satisfied, in the case that the movable body is positioned inside the second intersection region within the period in which the recommended stopping information based on the current indication of the traffic signal belonging to the first intersection continues to be provided.

There may further be provided the intersection region determination unit that determines the second intersection region corresponding to the second intersection, and the determination unit may determine that the predetermined condition is satisfied, in the case that the stop line (74A, 74B) corresponding to the traffic signal belonging to the first intersection is positioned inside the second intersection region.

The intersection region determination unit may determine the second intersection region on the basis of the intersection boundary (82B), which is a boundary between the intersection (70A, 70B) and the lane (80B).

The intersection boundary may coincide with the stop line (74A).

The intersection boundary may coincide with the starting point (84a) of the curved line constituting the contour of the corner portion (84) of the second intersection.

The intersection region determination unit may determine the second intersection region on the basis of the center (86) of the second intersection.

The external environment recognition unit may recognize the first intersection and the second intersection based on information acquired solely by the camera (32).

The information providing control unit may further include the line-of-sight determination unit (66) that carries out a control so as to display the recommended stopping information on the display unit (40) provided in the movable body, and determines the line of sight of the vehicle occupant, wherein, in the case it is determined by the line-of-sight determination unit that the line of sight of the vehicle occupant is not directed toward the display unit, the information providing control unit need not prevent the recommended stopping information based on the current indication of the traffic signal belonging to the second intersection from being displayed by the display unit.

The movable body is equipped with the information providing device as described above.

The method of providing information includes the determination step (step S6) of determining, in the case that the first intersection and the second intersection are positioned in the travel direction of the movable body, whether or not a degree of proximity of the first intersection and the second intersection satisfies the predetermined condition, and the prevention step (step S8) of preventing the recommended stopping information based on the current indication of the traffic signal belonging to the second intersection from being provided, in the case it is determined, in the determination step, that the predetermined condition is satisfied.

What is claimed is:

1. An information providing device comprising at least one processor configured to execute computer executable commands stored in a memory,
wherein, the at least one processor executes the computer executable commands to cause the information providing device to:
recognize an external environmental situation of a movable body;
provide recommended stopping information based on a current indication of recognized traffic signals;
in a case that a first intersection and a second intersection are positioned in a travel direction of the movable body, determine whether or not a degree of proximity of the first intersection and the second intersection satisfies a predetermined condition; and
in a case it is determined that the predetermined condition is satisfied, prevent the recommended stopping information based on a current indication of the traffic signal belonging to the second intersection from being provided.

2. The information providing device according to claim 1, wherein, in a case that a distance between the first intersection and the second intersection is less than a distance threshold value, the at least one processor causes the information providing device to determine that the predetermined condition is satisfied.

3. The information providing device according to claim 1, wherein, in a case that a distance between the traffic signal belonging to the first intersection and the traffic signal belonging to the second intersection is less than a distance threshold value, the at least one processor causes the information providing device to determine that the predetermined condition is satisfied.

4. The information providing device according to claim 1, wherein:
the at least one processor causes the information providing device to determine a first intersection region corresponding to the first intersection, and a second intersection region corresponding to the second intersection; and
in a case that the first intersection region and the second intersection region overlap, the at least one processor causes the information providing device to determine that the predetermined condition is satisfied.

5. The information providing device according to claim 4, wherein the at least one processor causes the information providing device to determine the second intersection region on basis of an intersection boundary which is a boundary between an intersection and a lane.

6. The information providing device according to claim 5, wherein the intersection boundary coincides with a stop line.

7. The information providing device according to claim 5, wherein the intersection boundary coincides with a starting point of a curved line constituting a contour of a corner portion of the second intersection.

8. The information providing device according to claim 4, wherein the at least one processor causes the information providing device to determine the second intersection region on basis of a center of the second intersection.

9. The information providing device according to claim 1, wherein:
the at least one processor causes the information providing device to determine a first intersection region corresponding to the first intersection and a second intersection region corresponding to the second intersection;
the at least one processor causes the information providing device to determine a provision starting point, which is a point at which provision of the recommended stopping information based on a current indication of the traffic signal belonging to the first intersection should be started;
the at least one processor causes the information processing device, after having started to provide the recommended stopping information at the provision starting point, to continue providing the recommended stopping information until the movable body is positioned outside of the first intersection region; and
the at least one processor causes the information providing device to determine that the predetermined condition is satisfied, in a case that the movable body is positioned inside the second intersection region within a period in which the recommended stopping information based on the current indication of the traffic signal belonging to the first intersection continues to be provided.

10. The information providing device according to claim 1, wherein:
the at least one processor causes the information providing device to determine a second intersection region corresponding to the second intersection; and
in a case that a stop line corresponding to the traffic signal belonging to the first intersection is positioned inside the second intersection region, the at least one processor causes the information providing device to determine that the predetermined condition is satisfied.

11. The information providing device according to claim 1, wherein the at least one processor causes the information providing device to recognize the first intersection and the second intersection based on information acquired solely by a camera.

12. The information providing device according to claim 1, wherein:
the at least one processor causes the information providing device to carry out a control so as to display the recommended stopping information on a display unit provided in the movable body;
the at least one processor causes the information providing device to determine a line of sight of a vehicle occupant; and
in a case it is determined that the line of sight of the vehicle occupant is not directed toward the display unit, the at least one processor causes the information providing device not to prevent the recommended stopping information based on the current indication of the traffic signal belonging to the second intersection from being displayed by the display unit.

13. A movable body comprising an information providing device, the information providing device comprising at least one processor configured to execute computer executable commands stored in a memory,
wherein, the at least one processor executes the computer executable commands to cause the information providing device to:
recognize an external environmental situation of a movable body;
provide recommended stopping information based on a current indication of recognized traffic signals;
in a case that a first intersection and a second intersection are positioned in a travel direction of the movable body, determine whether or not a degree of proximity of the first intersection and the second intersection satisfies a predetermined condition; and
in a case it is determined that the predetermined condition is satisfied, prevent the recommended stopping information based on a current indication of the traffic signal belonging to the second intersection from being provided.

14. A method of providing information, comprising:
determining, in a case that a first intersection and a second intersection are positioned in a travel direction of a movable body, whether or not a degree of proximity of the first intersection and the second intersection satisfies a predetermined condition; and
preventing recommended stopping information based on a current indication of a traffic signal belonging to the second intersection from being provided, in a case it is determined, in the determining, that the predetermined condition is satisfied.

* * * * *